(12) United States Patent
Lindbo

(10) Patent No.: US 6,423,214 B1
(45) Date of Patent: Jul. 23, 2002

(54) DEVICE FOR DECANTING SUPERNATANT

(76) Inventor: Glen D. Lindbo, 3108 Kaloaluiki Street, Honolulu, HI (US) 96822

( * ) Notice: Subject to any disclaimer, the term of this patent is extended or adjusted under 35 U.S.C. 154(b) by 0 days.

(21) Appl. No.: 09/978,473

(22) Filed: Oct. 15, 2001

Related U.S. Application Data

(62) Division of application No. 09/445,997, filed as application No. PCT/US99/22602 on Sep. 28, 1999, now Pat. No. 6,303,026.
(60) Provisional application No. 60/102,187, filed on Sep. 28, 1998.

(51) Int. Cl.$^7$ .............................................. B01D 33/00
(52) U.S. Cl. ..................... 210/122; 210/242.3
(58) Field of Search ........................ 210/122, 121–129, 210/242.3

(56) References Cited

U.S. PATENT DOCUMENTS

| | | | |
|---|---|---|---|
| 3,757,953 A | * 9/1973 | Sky-Eagle, Jr. .......... 210/242.1 |
| 4,645,592 A | 2/1987 | Calltharp et al. |
| 4,648,967 A | 3/1987 | Calltharp et al. |
| 4,695,376 A | 9/1987 | Astrom et al. |
| 4,711,716 A | 12/1987 | Calltharp et al. |
| 4,724,073 A | 2/1988 | Calltharp et al. |
| 4,775,467 A | 10/1988 | Calltharp et al. |
| 4,883,602 A | * 11/1989 | Anderson .................. 210/188 |
| 4,997,557 A | * 3/1991 | Andersen .................. 210/142 |
| 5,104,528 A | * 4/1992 | Christie .................... 210/122 |
| 5,234,580 A | * 8/1993 | Murphy .................... 137/395 |
| 5,358,644 A | * 10/1994 | Dennis ...................... 137/398 |
| 5,421,995 A | * 6/1995 | Norcross ................. 210/242.1 |

* cited by examiner

*Primary Examiner*—Chester T. Barry
(74) *Attorney, Agent, or Firm*—Martin E. Hsia

(57) ABSTRACT

A wastewater treatment tank with influent gates (24) and pre-react zone with an outwardly flared lower portion. Influent passes over influent gates (24), which introduce turbulence, causing aeration, and reducing flow velocity. As influent flows out of the influent gate housing (20), flow velocity is further reduced by contact with the surface of the wastewater in the basin and influent flow is directed laterally by an influent gate bottom (30). A pre-react zone director (34) spaced apart from the bottom (42) of the basin encloses the influent gate housing (20) and utilizes an outwardly flared lower portion, or flap (38), to further reduce flow velocity and enhance laminar flow. This results in minimal disturbance of settled sludge blanket, allowing it to act as a natural biological filter, which in turn results in a superior supernatant.

7 Claims, 7 Drawing Sheets

DEVICE FOR DECANTING SUPERNATANT

This application is a divisional of application Ser. No. 09/445,997, filed on Dec. 16, 1999, now U.S. Pat. No. 6,303,026, which itself claimed the priority of international application PCT/US99/22602, filed Sep. 28, 1999, which claimed the benefit of provisional application No. 60/102,187, filed Sep. 28, 1998.

TECHNICAL FIELD

This invention relates to a wastewater treatment tank with influent gates (to create turbulent flow and reduce influent flow velocity) and a pre-react zone director having an outwardly flared lower portion. The pre-react zone director causes laminar flow of influent below a settling blanket of sludge to avoid disturbing the blanket, thus allowing the blanket to function as a filter and resulting in a clearer supernatant than in conventional tanks.

Wastewater treatment facilities play an important role in society. As urban and rural populations continue to grow, however, these facilities become increasingly overtaxed and unable to meet the demands placed upon them. These increased demands cause many current wastewater treatment plants to operate near or at capacity. In addition, many treatment facilities were originally constructed decades ago, and utilize technology that is currently failing. Failing or inadequate treatment facilities pose an environmental concern, especially in light of increasingly stringent municipal, state, and federal environmental standards.

Due to the odious nature of wastewater treatment facilities, these facilities have often been constructed far from the sources of sewage to minimize exposure to populated areas. As a result, long sewage lines are needed to connect treatment plants to sewage sources. However, the acidic, corrosive and septic nature of wastewater, including hydrogen sulfide gas, which naturally occurs during the wastewater treatment process, causes the breakdown and failure of long sewage pipes.

To alleviate these problems, many areas have undertaken to either construct more treatment facilities, or to increase the efficiency of existing facilities. The construction of new facilities, however, may be blocked by those who fear the negative impact of such a facility in close proximity to urban or rural areas, such as the emanation of offensive odors, and the potential risk of untreated wastewater spillage. Increasing the efficiency of existing plants can come at great cost, and also poses the risk of interrupting current service.

In order to increase efficiency, and to lower consumer costs, many areas have privatized wastewater services. However, like any business, these private wastewater plants must be economically viable, and are faced with maintenance, energy, and other costs, which reduce profits and impede business growth.

Rapid development and population growth of third world countries also pose a significant sanitation and health risk, as wastewater needs cannot be met by current services. Therefore, these areas are especially in need of low cost, highly efficient wastewater treatment plants.

BACKGROUND ART

U.S. Pat. No. 5,302,289 to McClung, et al., discloses a wastewater treatment facility having an inlet in which there are a plurality of downwardly angled structures in a downcomer.

U.S. Pat. No. 4,230,570 to Irving discloses an aerator having an inlet having a downward and outward direction at the bottom, and adjacent inlet air provided by a manifold.

U.S. Pat. No. 5,051,213 to Weske discloses a method and apparatus for mixing fluids, which includes tines that are adjacent to gas inlets.

U.S. Pat. No. 4,162,971 to Zlokarnik, et al., discloses the use of deflecting elements to mix liquids and gas.

U.S. Pat. No. 4,081,368 to Block, et al., discloses the use of staggered partitions in treating wastewater.

U.S. Pat. No. 4,505,820 to Eertink discloses the use of multiple separate bioreactors in treating wastewater.

U.S. Pat. No. 4,705,634 to Reimann, et al., discloses the mixing of wastewater and activated sludge in the presence of carrier particles for microorganisms.

U.S. Pat. No. 4,136,023 to Kirk, et al., discloses an apparatus for wastewater treatment in which oxygenated wastewater is directed out through an adjustable flap.

U.S. Pat. No. 5,688,400 to Baxter, Sr. discloses a waste liquid treatment plant, which includes aeration for downwardly flowing liquid, air nozzles, and a conical section.

U.S. Pat. No. 3,804,255 to Speece discloses a recycling gas contact apparatus for waste material, which includes a downflow conducting cone member and bubble injector.

U.S. Pat. No. 4,421,648 to Besik discloses a single reaction tank in a single suspended growth sludge system that includes a conical shaped outlet section.

U.S. Pat. No. 4,452,701 to Garrett, et al., discloses an open-bottomed stilling chamber above an open-topped chamber with a conical outlet.

It is therefore an object of this invention to provide methods and apparatus for a wastewater treatment system, having influent gates and pre-react zone with outwardly flared lower portion to achieve tertiary treatment results (at least in certain fields of use) from a secondary treatment facility using a single tank. In this connection, primary treatment is usually understood to include settling and anaerobic processes, secondary treatment is usually understood to include aerobic processes, and tertiary treatment is usually understood to include filtering.

It is a still further object of this invention to provide methods and apparatus for low-cost, high-efficiency wastewater treatment systems.

It is a still further object of this invention to provide a process and apparatus that substantially reduces production of sewage sludge.

It is a still further object of this invention to provide a process and apparatus that reduces energy consumption by reducing the number of pumps and blowers needed for operation.

It is a still further object of this invention to provide an apparatus with minimal moving parts.

It is a still further object of this invention to provide such methods and apparatus that combines processes to eliminate the need for multiple stage components, thereby eliminating the odors, maintenance and land requirements, and other costs associated with multi-stage complex wastewater systems.

It is a still further object of this invention to provide methods and apparatus resulting in more nutrient and chemical removal than previous wastewater systems.

It is a still further object of this invention to provide methods and apparatus which is simple in construction and operation so that malfunctions can be easily and quickly diagnosed to reduce the costs of repair and maintenance.

It is a still further object of this invention to provide methods and apparatus that are scalable so that multiple smaller decentralized plants can be used instead of large centralized plants with long pipelines, which allows geographic dispersal of such plants and reduction of peak flows of effluent in particular areas.

It is a still further object of this invention to provide methods and apparatus that allow plants of particular capacity to be constructed using up to 50% less land.

It is a still further object of this invention to provide methods and apparatus that can be operated with less manpower.

It is a still further object of this invention to provide methods and apparatus that allow multiple modular plants with continuous influent flow and intermittent decanting to allow the environment to recover between decants, and allows multiple staggered decanting so that common effluent facilities need only have the capacity to handle one or two (or more, but less than all) modules at a time.

It is a still further object of this invention to provide methods and apparatus that can be easily retrofittable to existing properly sized basins.

It is a still further object of this invention to provide methods and apparatus that denitrify the system by both aerobic and anaerobic processes to avoid algae blooms.

DISCLOSURE OF INVENTION

These and other objects are achieved by a device to treat influent that includes a basin with an influent gate housing in the basin to receive influent. Influent gates are mounted inside the influent gate housing so that influent flows over the influent gates, creating turbulent flow and aeration in the influent, and reducing flow velocity of the influent. An influent gate bottom is mounted in the basin under the influent gate housing so that influent exiting the bottom portion of the influent gate housing is directed laterally. A pre-react zone director having an outwardly flared lower portion is mounted to the basin and at least partially encloses the influent gate housing. The pre-react zone director defines a main react zone inside the basin, but outside the pre-react zone director, and the lower portion of the pre-react zone director is spaced apart from the bottom of the basin and defines a contact zone between the lower portion and the bottom of the basin. The pre-react zone director decreases influent flow velocity and directs flow of said influent in a laminar fashion through the contact zone and into the main react zone, so that the influent avoids disturbing any settled sludge in the main react zone and allows formation of a supernatant. The influent does not disturb the settled sludge and is filtered through the sludge (which acts as a biological filter) before forming the supernatant, so that the supernatant is comparable to filtered supernatant. Thus, settling (the settling sludge blanket), aerobic processing (passing the supernatant over the gates), anaerobic processing (the biological activity in the settling sludge blanket) and filtering (passing the influent through the settling sludge blanket to form the supernatant) are all performed in a single basin.

This invention substantially reduces sewage sludge production and energy consumption by wastewater treatment systems, by utilizing a non-mechanical process that uses fewer pumps and blowers than a conventional wastewater treatment system, and utilizes a minimum of moving parts. It reduces plant size, and therefore reduces land requirements, by up to approximately 50% from that of conventional wastewater treatment facilities, and requires only approximately 6 months to 1 year of design and construction time. This invention also requires less manpower and maintenance due to fewer components.

Furthermore, as the use of septic tanks is being restricted by state and municipal regulations, affecting both residential and commercial properties, this invention allows for a septic tank replacement, without having to expend time and money to connect these properties to a large centralized system, or to construct an entirely new sewage infrastructure. This is particularly advantageous for remote small scale commercial developments.

This invention therefore allows the construction of smaller plants closer to the sources of sewage, resulting in shorter sewage pipes, which allow a shorter resident time of influent within the pipes, and therefore significantly reduces exposure to sewage and the possibility of failure.

This invention allows a continuous sewage influent flow into a single basin wastewater treatment system. The modular nature of the invention allows multiple basins to be used, thus allowing multiple staggered decanting so that effluent facilities can be shared and do not have to be as large as conventional ones. This intermittent decanting allows the environment to recover between decanting.

The influent flow travels over the influent gates, creating turbulence in the flow and reducing downward flow velocity. The resulting turbulent flow allows air, in the form of minute bubbles, to be mixed into the influent stream, which starts aerating the influent flow. These minute bubbles also cause a reversing action of the influent flow upon contact with the surface of the wastewater in the basin. This reversing action reduces downward velocities, and thus works in conjunction with the influent gates. The exit of the influent gate housing is below the level of wastewater in the basin.

There are preferably one or more influent gates located within the influent gate housing. These gates are preferably located above the lowest normal wastewater level within the basin. To utilize their turbulent flow/aeration properties, however, gates may also be placed below the wastewater level if further flow velocity reduction is required. Although utilizing no gates falls within the operable range of the invention, it is preferable to have at least one gate. Optimally, there should be more than one gate installed to achieve the best quality effluent.

The influent gates are strategically spaced with the first gate preferably placed approximately one diameter down the vertical influent riser from the influent intake. The first gate is optimally placed approximately where the influent would first hit the wall of the influent gate housing on the side opposite the incoming influent flow. Subsequent gates would preferably be mounted on alternating sides of the interior of the influent gate housing. The flow will thus have a horizontal backward/forward motion as it travels vertically down the riser portion of the influent gate housing (the influent riser). Although it is within the operable range of this invention to have the gates placed in many other positions within the influent gate housing, the gates should preferably be placed in a zig-zag manner down the vertical influent riser, spaced apart from each other by approximately the diameter (or width) of the riser. Enough gates should be provided so that the lowest gate is above the lowest wastewater level (bottom water level) expected during normal operation.

It falls within the operable range of the invention for each gate to be aligned at a downward angle between 90 and 180 degrees from the plane of the influent gate housing wall. However, the greater the angle, the greater the likelihood of un-screened debris within the influent stream getting caught on the gate. Therefore, preferably, the gates should be at a downward angle greater than 90 degrees from the plane of the influent gate housing wall. Optimally, the gates should be at a downward angle between 120 and 135 degrees from the plane of the influent gate housing wall.

After flow velocities are reduced utilizing the influent gates, the influent stream then flows through the basin in a laminar fashion via an outwardly flared portion of the pre-react zone, as described below. As the stream flows to the bottom of the vertical riser portion of the influent gate housing, the stream encounters the floor, or bottom fitting, which is designed to stop downward flow velocities. This bottom fitting is preferably placed at a level below the lowest normal wastewater level in the basin (brought about by normal hydraulic equalization of the entire basin). When the influent flow reaches the surface of the wastewater, splashing further reduces the influent flow velocity.

The bottom fitting is preferably a standard "T" fitting affixed to the base of the vertical riser portion of the influent gate housing. This "T" fitting is preferably of a multi-port design, having two openings to direct the influent flow in a lateral direction, however, it is within the operable range of the invention to have more or less openings.

Alternatively, it is within the operable range of the invention if there were no bottom "T" fitting affixed to the bottom of the vertical riser portion of the influent gate housing. In order to achieve downward flow velocity reduction, a disc or platform may be supported above the floor of the basin, preferably with a peg or some other support, directly below the bottom opening of the influent gate housing. In this alternative design form, flow behavior would not change significantly. As discussed above, the influent flow would travel through the vertical riser portion of the influent gate housing, encountering the influent gates, which create turbulent flow and reduce downward flow velocity. Upon contact with the surface of the wastewater, which is above the bottom exit of the influent gate housing, both splash energy and the reversing action of the turbulent flow further reduce downward flow velocity. As the flow continues downward after contact with the surface, it encounters the disc or platform, which then omni-directionally directs flow laterally, as opposed to a "T" fitting, which directs flow laterally through ports.

If no bottom fitting is utilized, then the base of the vertical riser portion of the influent gate housing would preferably have a 90 degree lip extending 360 degrees around the bottom exit of the influent gate housing. This lip would act as an upward ceiling to assist in directing the flow laterally. It is within the operable range of the invention to have no lip, but such a lip is preferred to enhance lateral flow out of the influent gate housing. If there are multiple influent gate housings within the pre-react zone director, then the surface of the disc or platform preferably extends to cover the entire opening area of the pre-react zone director. It is within the operable range of the invention for the disc or platform to be in any geometric shape, however, if only one influent gate housing is utilized, it is preferable that the disc or platform be the same shape as the base of the influent gate housing. If multiple influent gate housings are utilized within a single pre-react zone director, then the disc or platform should preferably be the same shape as the base of the pre-react zone director.

After the influent flow undergoes turbulent aeration and velocity reduction in the influent gate housing, influent velocity is reduced further and then directed via the pre-react zone director into the main react zone of the basin for treatment. The pre-react zone director is designed such that one or more walls create a chamber that separates initial influent flows from the rest of the influent within the basin. This prevents the initial influent flow from mixing with and disturbing the main react zone's settled biomass during the settle and decant phases of operation. This allows optimal operation of the settled sludge blanket (biomass) as a natural biological filter.

The pre-react zone director utilizes a flap at its base to direct the flow in a laminar fashion into the main react zone. As a result, disturbances of the settled sludge blanket are minimized, thus creating a dense natural biological filter (biomass), which absorbs biological nutrients and chemicals from the influent sewage stream during the settle phases of operation, and thus creating a superior supernatant for decant. Furthermore, the downward and outward direction of the influent allows increased contact between the influent and resulting biomass, which in turn results in more nutrient and chemical removal than previous systems.

It is within the operable range of the invention if the pre-react zone director utilizes any geometric shape, however, it should preferably be either rectangular, square, triangular, or circular to facilitate installation of the flap. The pre-react zone director is preferably affixed to the side of the main basin wall opposite the decanter, and situated in the center of the main basin's width. It is within the operable range of the invention if the pre-react zone director is suspended in the basin via flotation devices and anchored in some manner, however, it is preferable that the pre-react zone director be affixed and mounted to the basin wall for structural support and aesthetics. Optimally, the pre-react zone director should be mounted on posts, affixed to the basin wall opposite the decanter, in the middle of the basin width, with the posts being affixed to either the bottom or top of the basin. Where this optimal configuration is difficult (such as with fiberglass basins, or basins in which the wall opposite the decanter is curved or otherwise irregularly shaped), it is then preferable to have the pre-react zone director affixed to the top of the basin, or mounted on posts, which are affixed to the bottom of the basin.

The pre-react zone director flap is an angled lip that extends around the entire perimeter of the base of the pre-react zone director. It is within the operable range of the invention that the flap be aligned at an outward angle between 0 and 180 degrees from the plane of the pre-react zone director wall. The flap should preferably be aligned at an outward angle of greater than 90 degrees from the plane of the pre-react zone director wall. Optimally, the flap should be aligned at a down and outward angle of 120 to 135 degrees from the plane of the pre-react zone director wall. This optimal angle alignment allows for optimum laminar flow of the influent into the main react zone.

It is within the operable range of the invention if the leading edge of the flap where the flap is connected to the base of the pre-react zone director is jagged or uneven. However, the leading edge should preferably be square. Optimally, the edge should be rounded to allow optimum laminar flow of the influent, and decrease turbulent flow under the flap. In addition to reducing turbulence and creating laminar flows, the flap also adds structural strength to the pre-react zone director. It has been found that other systems utilizing a react zone need eventual replacement of the react zone walls because those walls tend to fail after continuous flexing caused by turbulent flow during the aeration phases of operation. By reducing this turbulence, the flap reduces the stresses on the pre-react zone director walls, and extends the structural longevity of the pre-react zone director.

The pre-react zone director encloses the influent gate housing(s) within the basin. Because it rests above the floor of the basin, there is a submerged gap between the flap and the basin floor. This gap comprises the contact zone, where the initial influent flow exits the pre-react zone director and comes into contact with the settled sludge blanket within the main react zone. It is within the operable range of the invention if the pre-react zone director comprises a single wall stretching the width of the basin, thereby creating a 180 degree enclosure of the influent gate housing. This thereby creates a 180 degree contact zone, which is within the operable range of the invention. The pre-react zone director should preferably surround the influent gate housing with a minimum of 270 degrees of enclosure, creating a preferred 270 degree contact zone. It is optimal for the pre-react zone director to completely surround the influent gate housing with a 360 degree enclosure, which allows for an optimal 360 degree contact zone, and which makes optimum usage of the biological filter in the settled sludge blanket.

This device eliminates the need for a separate clarifier, aeration basin, and settling basin, as this invention combines all these elements within one basin. The simplicity of this invention thus eliminates the odors, maintenance, land requirements, and other costs associated with other multi-basin complex wastewater systems. Furthermore, aeration basins for other technologies typically are larger than the clarifiers associated with them. This invention allows the basin to act as a unified clarifier and aeration basin during the cyclic aeration cycle, thus achieving the clarification in a basin that is the same size as the aeration basin. This eliminates the need for separate basins, and substantially reduces the need for sludge return lines, and their associated costs.

BEST MODES FOR CARRYING OUT INVENTION

The presently preferred best modes for carrying out the present invention are illustrated by way of example in FIGS. 1 to 7.

Figure 1:
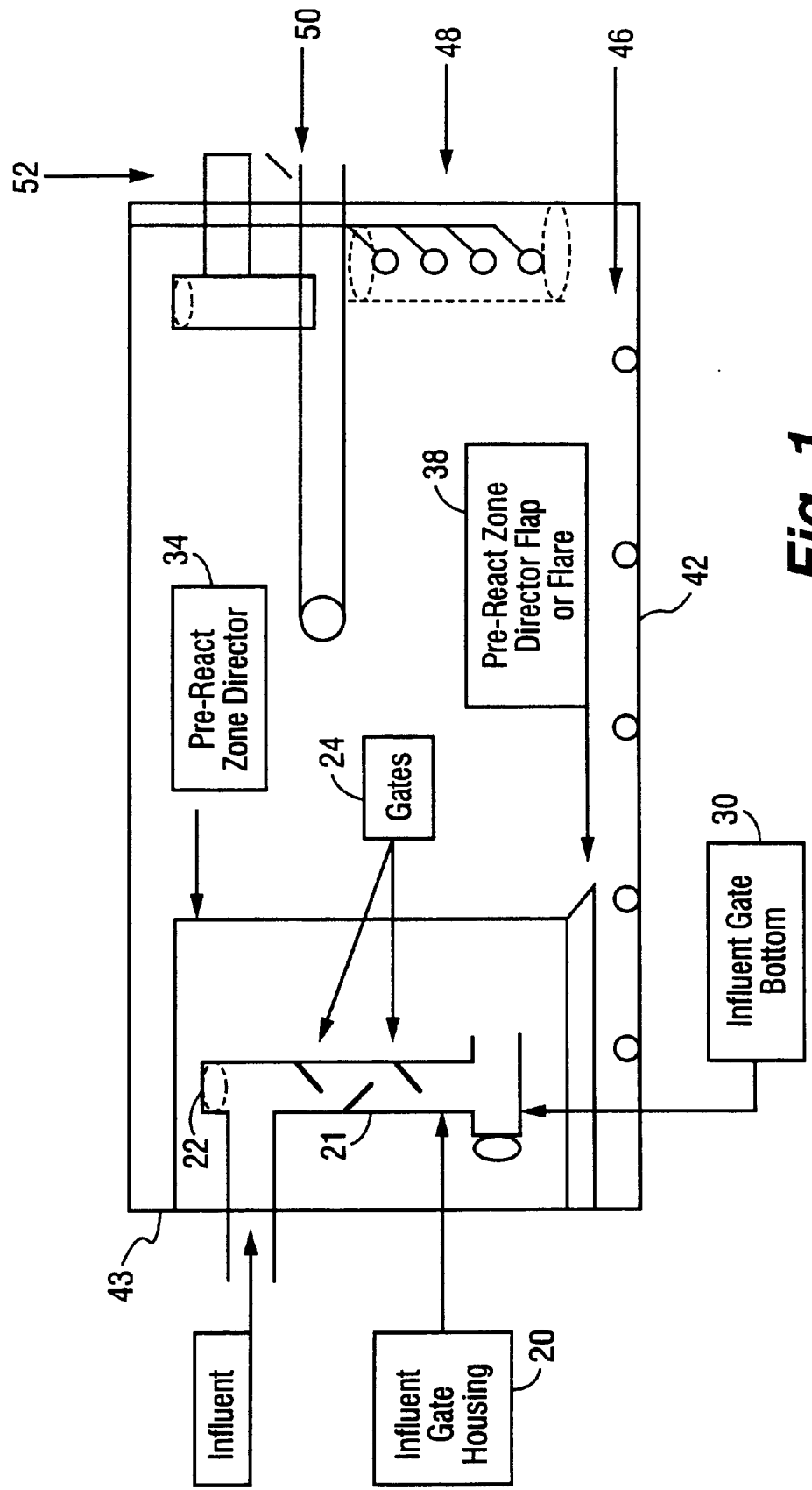
FIG. 1 is a side elevational cutaway view of a presently preferred embodiment of the present invention.

Referring to FIG. 1, shown is a presently preferred embodiment of the present invention. The invention comprises the influent gate housing 20, influent, gates 24, influent gate bottom 30, and pre-react zone director 34 with flap 38, within a single basin 42. The air diffusers 46, float tree 48, decanter 50, and emergency overflow 52 are standard components of a wastewater treatment basin, and it is well within the skill of a person of ordinary skill in the art to select and install these components.

The influent gate housing 20 comprises a vertical riser portion 21, an opening 22 at the top of the vertical riser portion 21, influent gates 24, and an influent gate bottom 30. Preferably, the components of the influent gate housing 20 should be made of any product that is non-corrosive in the particular wastewater stream that is being treated, such as PVC, fiberglass, lined (sealed) concrete, and stainless steel, but is not limited to these materials. Preferably, the vertical riser portion 21 of the influent gate housing 20 is a cylindrical pipe. Because normal operations of influent stream usually have an air pocket at the top of the vertical riser portion 21, it is within the operable range of the invention to have no opening 22. However, it is preferable to have, at a minimum, a removable cover, that can be removed for cleaning, maintenance, or inspection purposes. optimally, there should merely be an opening 22 for aeration, ease of cleaning, and maintenance inspections (FIG. 4).

In normal operations, influent stream enters the basin via the influent gate housing 20. The influent flow travels vertically downward over the influent gates 24. The influent gates 24 act as baffles within the vertical riser 21 and create turbulence within the influent stream that aerates the influent flow. The influent gates 24 preferably comprise non-corrosive material that is appropriate for the particular wastewater being treated, such as PVC, fiberglass, and stainless steel, but is not limited to these materials.

Figure 4:
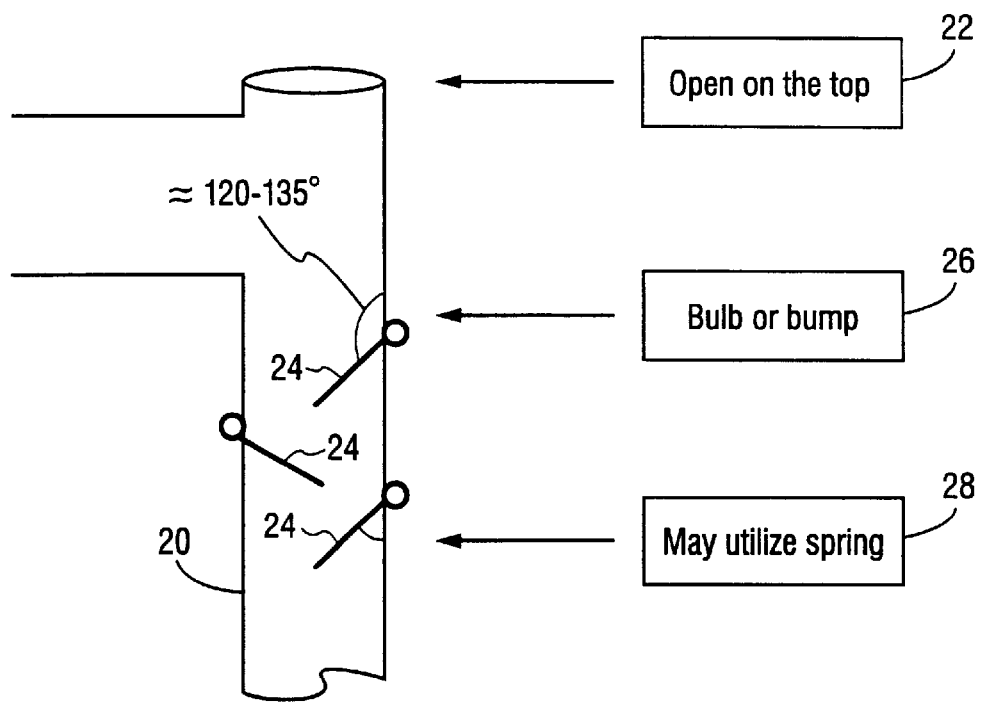
FIG. 4 is a side elevational cutaway view of the influent gate housing.

Each influent gate 24 is preferably set at a downward angle greater than 90 degrees from the plane of the influent gate housing 20. optimally, the influent gates 24 should be at a downward angle between 120 and 135 degrees from the plane of the influent gate housing 20 (FIG. 4). Each influent gate 24 is affixed to the vertical riser portion 21 of the influent gate housing 20 as shown in FIG. 4. Preferably, each influent gate 24 is affixed by being placed in a slot within the vertical riser 21, with each slot being sealed, preferably with a rubber seal or glue (but not limited to such means) to keep the influent gate 24 in place, and to prevent influent from leaking outside the influent gate housing 20. Affixing the influent gates 24 in such a manner allows the influent gates 24 to be removed for replacement, or angle adjustment if deemed necessary.

Preferably, each influent gate 24 will have a bulb or bump 26 affixed to the end of the influent gate 24 that is on the exterior side of the influent gate housing 20. This bulb 26 prevents the influent gate 24 from sliding into the interior of the influent gate housing 20, and in conjunction with said rubber seal or glue, holds the influent gate 24 in place.

Alternatively, the influent gate 24 may be installed and affixed to the influent gate housing 20 with a hinge and a spring mechanism 28 may be affixed on the underside of the influent gate 24, connected to the influent gate housing 20, as shown in FIG. 4. This will allow the influent gate 24 to open completely in the event that debris or some other material becomes clogged within the vertical riser portion 21 of the influent gate housing 20.

Figure 2:
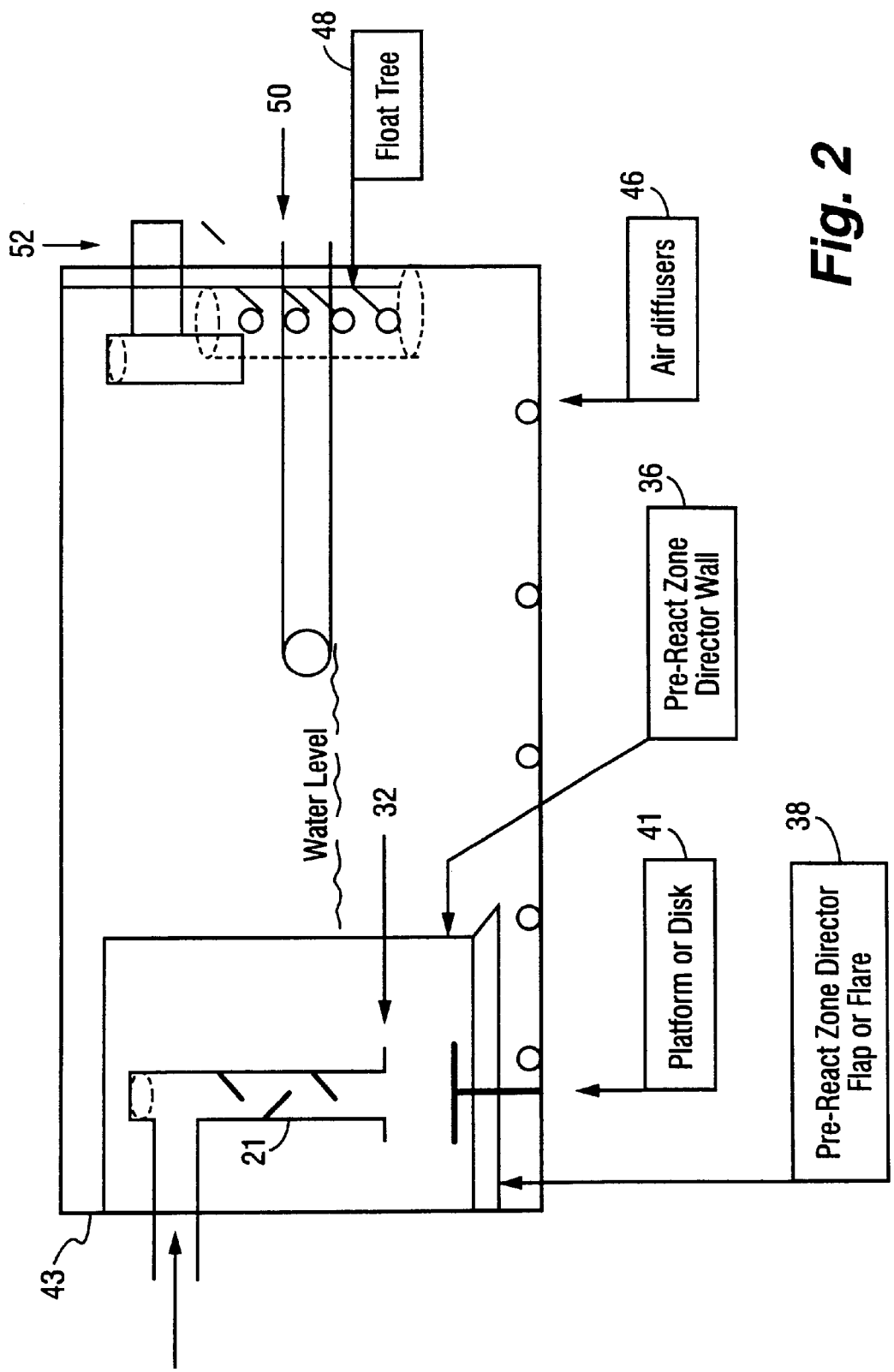
FIG. 2 is a schematic diagram of an alternative embodiment of FIG. 1 and includes an optional platform or disk at the base of the influent gate housing.

Although the number of influent gates 24 installed within the influent gate housing 20 may vary according to the needs of the particular wastewater system, it is preferable to have at least one influent gate 24 installed within the influent gate housing 20. Although it is within the operable range of the invention to have no influent gates 24, optimally, more than one influent gate 24 should be installed to achieve the best quality effluent. Preferably, each influent gate should be placed in an alternating pattern, equally spaced apart and extending at least halfway down the side of the vertical riser portion 21 of the influent gate housing 20, as shown in FIGS. 1, 2 and 4. Optimally, the topmost influent gate 24 should be positioned on the side of the vertical riser 21 opposite the initial influent flow, as shown in FIGS. 1 and 2. Each influent gate 24 thereafter would preferably be placed in an alternating pattern, equally spaced down the vertical riser 21.

In normal operations, after the influent flow travels over the influent gates 24, the influent flow then exits the vertical riser portion 21 of the influent gate housing 20. Preferably, there is a influent gate housing bottom 30 affixed to the bottom end of the vertical riser portion 21, preferably comprising a multi-ported "T" pipe fitting, as shown in FIG. 1. Preferably, the "T" fitting should have two openings. However, it is within the operable range of the invention to have more or less openings, to accommodate the particular wastewater system in operation.

Referring to FIG. 2, shown is an alternative embodiment in which, instead of a "T" fitting, the influent gate housing bottom has a 90 degree lateral lip extending at least partially (but preferably completely) around the bottom edge of the vertical riser portion 21 of the influent gate housing, and a disc or platform 41 supported above the bottom of the basin via a peg or some other vertical support affixed to the bottom of the basin. Preferably, the surface of disc or platform 41 should be co-extensive with the bottom opening of the influent gate housing 20. Preferably, the shape of the disc or platform 41 should be the same as the shape of the bottom of the influent gate housing.

Figure 3:
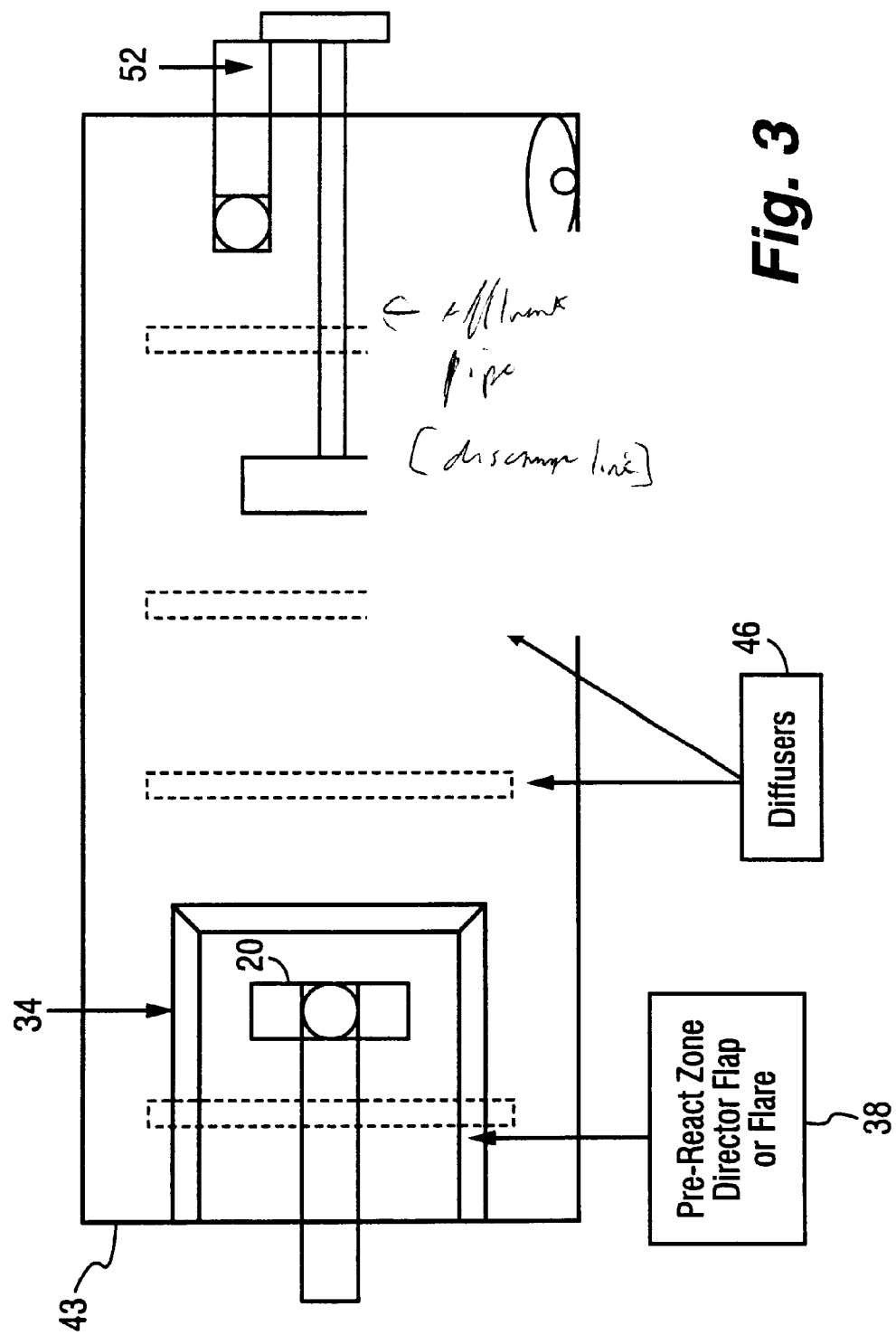
FIG. 3 is top plan view of the embodiment of FIG. 1.
Figure 7:
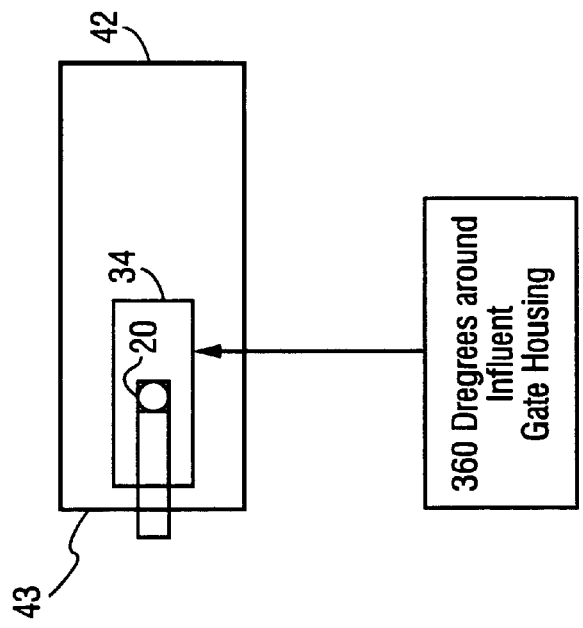
FIG. 7 is a top elevational view of the influent gate housing and basin of the alternative embodiment of FIG. 2, whereby the pre-react zone director surrounds 180 degrees around the influent gate housing.
Figure 6:
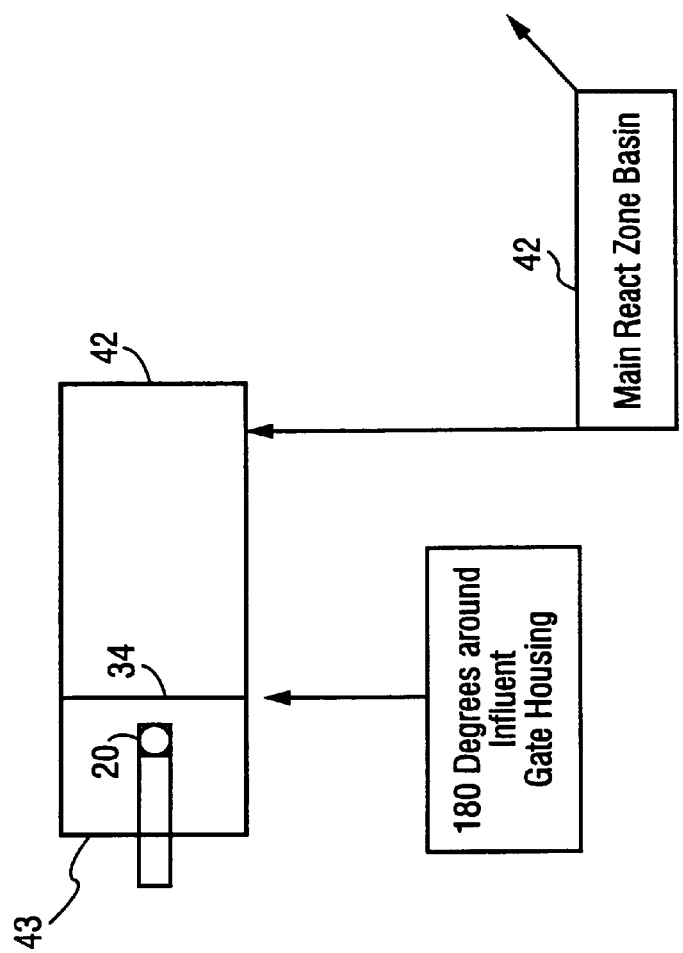
FIG. 6 is a top elevational view of the influent gate housing and basin of the presently preferred embodiment of the present invention.

The pre-react zone director 34 comprises one or more walls surrounding the influent gate housing 20 to create a chamber that separates initial influent flows from the rest of the flow within the basin 42, as shown in FIGS. 1, 2, 6, and 7. Preferably, the pre-react zone director is any geometric shape that allows an outwardly directed flap 38 to be affixed to the bottom edge of the pre-react zone director 34. Such geometric shapes include a rectangular, square, triangular, or circular shape, but is not limited to these shapes. It is within the operable range of the invention if the pre-react zone director 34 comprises a single wall stretching the width of the basin, thereby creating a 180 degree enclosure of the influent gate housing 20, as shown in FIG. 6. The pre-react zone director 34 should preferably surround the influent gate housing 20 with a minimum of 270 degrees of enclosure, as shown in FIG. 3. It is optimal for the pre-react zone director 34 to completely surround the influent gate housing 20 with a 360 degree enclosure, as shown in FIG. 7.

The pre-react zone director 34 is preferably affixed to the side of the main basin wall 43 opposite the decanter 50, and situated in the center of the main basin wall's width. It is within the operable range of the invention if the pre-react zone director 34 is suspended in the basin 42 via flotation devices and anchored in some manner, however, it is preferable that the pre-react zone director 34 be affixed and mounted to the basin wall 43. Optimally, the pre-react zone director 34 should be mounted on posts, affixed to the basin wall 43 opposite the decanter 50, in the middle of the basin wall's width, with the posts being affixed to either the bottom or top of the basin 42.

Figure 5:
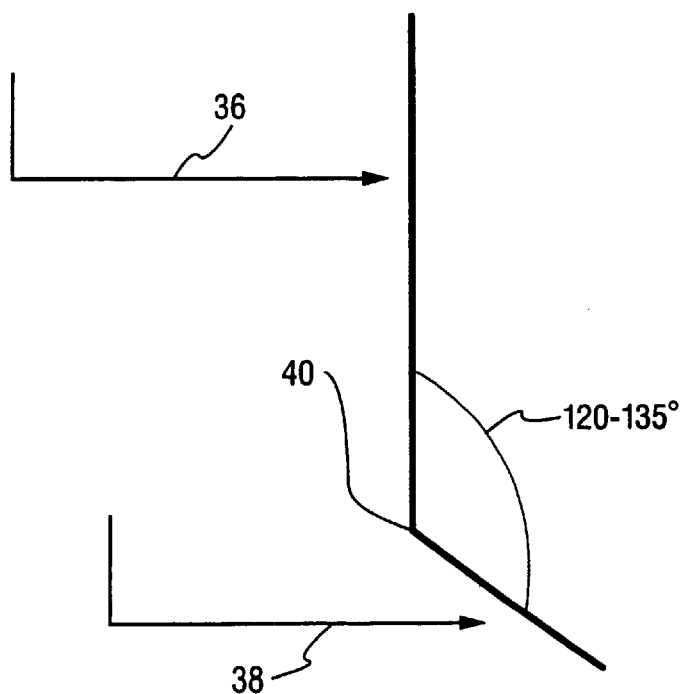
FIG. 5 is a partial side elevational view of the pre-react zone director flap.

The pre-react zone director 34 preferably comprises a flap 38, which is an angled lip that extends around the entire perimeter of the base of the pre-react zone director 34, as shown in FIGS. 1, 2, and 3. It is within the operable range of the invention that the flap 38 angled outwardly between 0 and 180 degrees from the plane of the pre-react zone director 34 wall. The flap 38 should preferably be angled outwardly greater than 90 degrees from the plane of the pre-react zone director 34 wall. Optimally, the flap 38 should be aligned downwardly and outwardly at 120 to 135 degrees from the plane of the pre-react zone director 34 wall, as shown in FIG. 5.

It is within the operable range of the invention if the leading edge 40 of the flap 38 is jagged or uneven. However, the leading edge 40 should preferably be square. Optimally, the leading edge 40 should be rounded. The trailing edge of the flap 38 may comprise a straight edge, or a rounded edge.

The overall operation of the present invention will now be described. The influent continuously flows into the influent gate housing 20 and strikes the topmost of the gates 24. The velocity of the influent is reduced as it cascades through the remaining gates 24 and reaches the bottom of the influent gate housing 20. The influent meets the surface of the wastewater before it reaches the bottom of the influent gate housing, and its velocity is thereby further reduced. The influent is then directed laterally by the influent gate bottom 30 (or the platform or disk in an alternative embodiment). The influent then travels downwardly through the pre-react zone director 34 until it reaches the pre-react zone director flap 38. The space between the bottom of the basin 42 and the pre-react zone director flap 38 is the contact zone, and the influent is constrained by the pre-react zone director flap (and other structural features of the invention) to flow through the contact zone in a laminar fashion. Because the influent flows laminarly, it avoids disturbing the settling sludge blanket. Yet, because the influent flows laterally, it is exposed to a large surface area of the settling sludge blanket, and therefore exposed to a large surface area of anaerobic activity of the sludge blanket.

Although the influent flows continuously, settling and decanting proceed in a batch manner. Initially, the influent is allowed to fill the basin 42, and the air diffusers 46 are activated to aerate the influent. When the level of influent reaches the normal high water level, as determined by the float trees 48 (or any other control mechanism, such as a timer), the air diffusers 46 are deactivated and a pump (not shown) is activated to pump out the supernatant through the decanter 50. It is preferable that the decanter 50 float on the surface of the influent and draw supernatant from just below the surface of the influent. The decanter 50 draws supernatant until the normal low level of water is reached (or some other event occurs, such as passage of a predetermined time). The air diffusers 46 are preferably reactivated after enough time has passed for microbiological processes to be completed in the settled sludge blanket, and the cycle then starts again. A typical cycle would be 2 hours of air diffusers and 2 hours of settling and decanting.

Preferably the decanter 50 pumps out supernatant at a rate just less than the rate at which the sludge and other solids settle towards the bottom, so that the decanter 50 pumps out clear supernatant at the highest possible rate. Because the pre-react zone director flap and other structures of the invention cause the influent to flow into the main react zone in a laminar fashion, there is minimal disturbance to the settled sludge blanket, allowing it to act as a natural biological filter.

Figure 8:
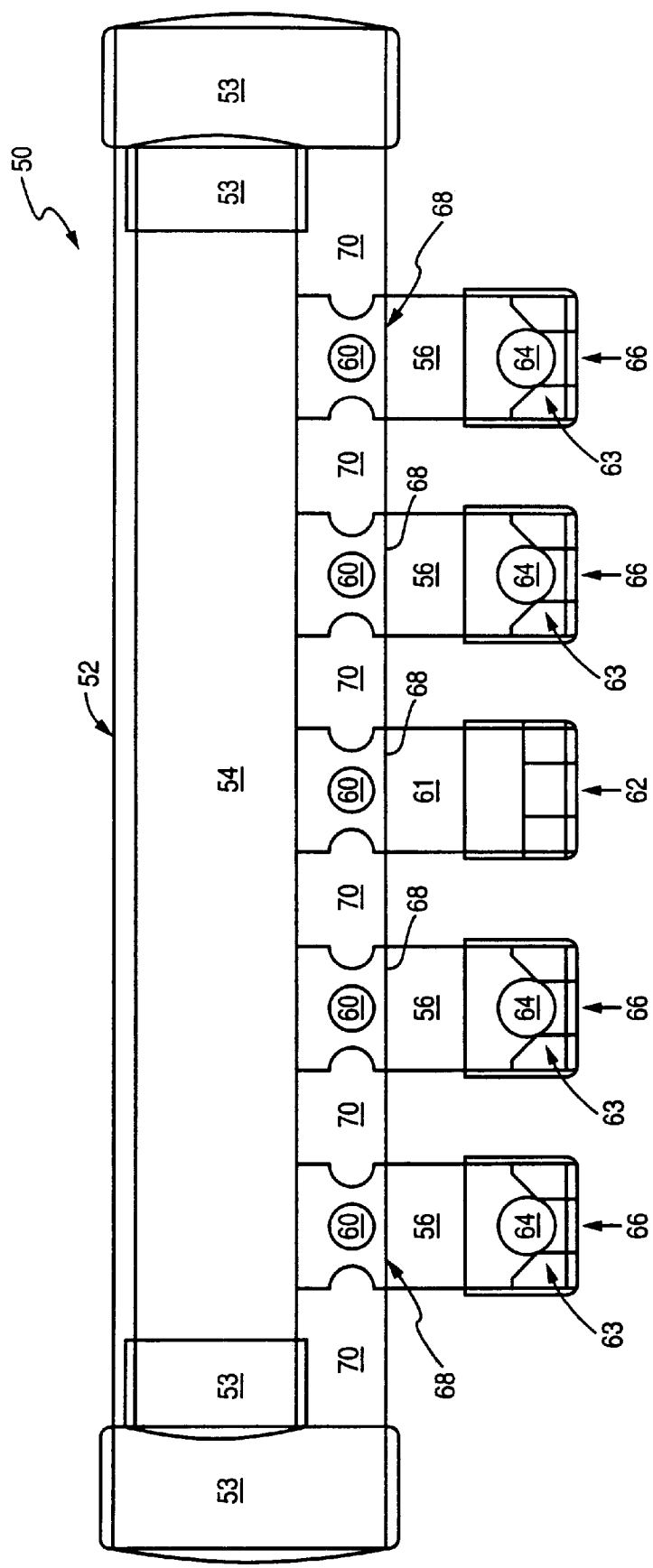
FIG. 8 is a side elevational cutaway view of a presently preferred decanter according to the present invention.
Figure 9:
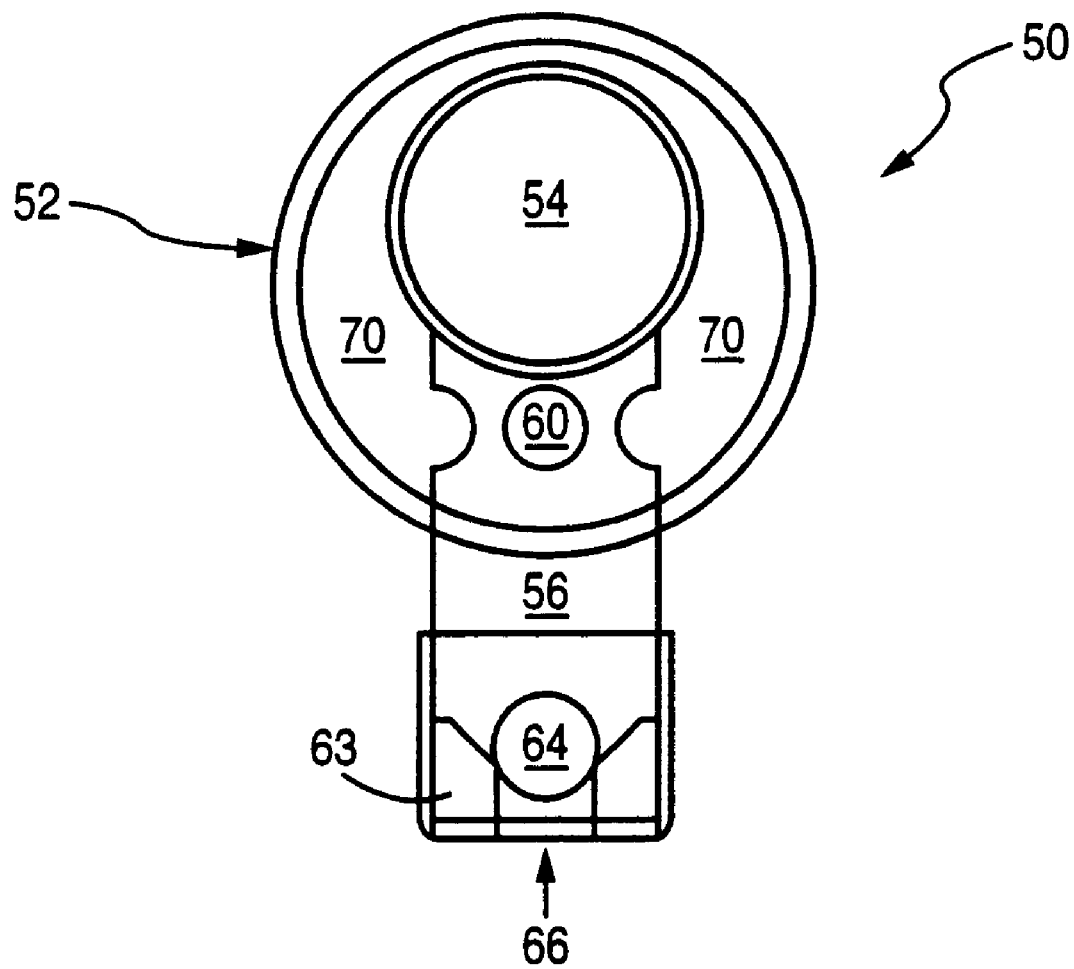
FIG. 9 is an end elevational cutaway view of the decanter of FIG. 8.

Referring to FIGS. 8 and 9, shown is a preferred embodiment 50 of the decanter of the present invention. The body 52 of the decanter houses an airtight bladder 54 that is filled with air and used for flotation of the entire decanter 50. Both the bladder 54 and the body 52 of the decanter have end-caps or seals 53. On the bottom of the body 52 are a number of holes 68 to which check valve risers 56 and a decanter pump riser 61 are attached and in fluid communication. Risers 56 and 61 are then secured to body 52 with a watertight seal over the holes 68 and (preferably) tack glued to the bladder 54. A decanter pump or decanter arm is attached to the decanter riser 61 at the decanter effluent exit port 62. At the bottom of each of the check valve risers 56 is a ball check valve which includes a ball 64 set into a check valve housing 63 above a supernatant intake port 66. During operation of the decanter 50, the decanter pump will provide a vacuum at the decanter effluent exit port 62, and because body 52 is airtight, the supernatant will be drawn through the intake ports 66, thus raising the balls 64 and opening the ball check valves. The decanted supernatant will then travel up the check valve risers 56 and out the riser holes 60 and flow into the space 70 between the body of the decanter 52 and the pipe bladder 54. The decanted supernatant will then be drawn further to flow through holes 60 on the decanter pump riser 61 and down through the decanter effluent exit port 62, to be discharged as effluent.

WORKING EXAMPLE

Definitions
1. AWL Alarm Water Level
2. ALPHA Surface tension factors
3. AOR Actual Oxygen Requirement
4. BWL Bottom Water Level
5. BETA Gas solubility factors
6. BOD-5 Biochemical Oxygen Demand
7. CSM Oxygen Saturation Coefficient
8. Decant To pour gently so as to not disturb the sediment.
9. DO Dissolved oxygen
10. Effluent Outgoing wastewater
11. F:M ratio Food to microorganism ratio
12. HWL High Water Level
13. Influent Incoming wastewater
14. MLSS Mixed liquor suspended solids
15. MLVSS Mixed liquor volatile suspended solids
16. NH3-N Ammonia Nitrogen
17. P Phosphorous
18. SOR Standard Oxygen Requirement
19. THETA Water Temperature
20. TKN Total Kjeldahl Nitrogen
21. TSS: Total suspended solids
22. TWL Top Water Level The following is a general overview of the design process that has been used for designing plants.

The basic characteristics of the influent for the plant must be determined. This includes amount of flow, strength, and type of wastewater to be treated. The effluent requirements for the plant must also be considered. There is a balance between what is feasible with regards to basin sizing, and the strength of wastewater. If it is determined that the wastewater is of a relatively high strength, or exceeds the necessary effluent parameter, it may be necessary to utilize one of various pre-treatment processes. The options are either to reduce the strength, or (possibly) size the basin to accommodate the chemical imbalance and strength of the BOD-5 loading. The primary design parameters are daily flow, peak flow, BOD-5, TSS, P, NH3-N, and TKN, which are the most common characteristics for which effluent is tested. However, the primary design parameters are not limited to these tests and may require more extensive testing depending on the specific project.

The number of cycles required to accommodate the various strengths of wastewater are determined next. Preferably, between 4 to 6 cycles per day are provided to achieve a sludge age of 30 to 70 days. The sludge yield is then adjusted by applying the correct coefficient, which may be obtained from almost any wastewater treatment design manual, such as *Wastewater Engineering, Treatment/ Disposal/Reuse,* Second Edition, Metcalf & Eddy, Inc.; M. J. Hammer, *Water and Wastewater Technology,* Second Edition; *Wastewater Engineering, Collection and Pumping of Wastewater,* Metcalf & Eddy, Inc.; J. W. Clark, W. Biessman, Jr., M. J. Hammer, *Water Supply and Pollution Control,* Third edition; H. Morris, J. Wiggert, *Applied Hydraulics in Engineering,* Second edition; E. F. Brater & H. W. King, *Handbook of Hydraulics,* sixth edition; J. A. Roberson & C. T. Crowe, *Engineering Fluid Mechanics,* second edition; M. R. Lindeburg, *Civil Engineering Reference Manual,* $4^{th}$ edition; M. Henze, *Wastewater Treatment, Biological and Chemical Processes;* and F. S. Merritt, *Standard Handbook for Civil Engineers,* third edition, all of which are incorporated herein by reference. The sludge yield is a function of the sludge age chosen. Sludge age affects the basin size and the stability of the system as well as sludge production. The volume required at BWL is basically a function of waste removed and sludge age. Following recommended parameters for sludge age and MLVSS will almost always result in a F:M ratio between 0.05 and 0.10. Next, the minimum alkalinity required for proper denitrification must be calculated so that it will be greater than 158 mg/l with the minimum P required at almost always 2.0 mg/l.

Basin geometry is calculated by the given property and spatial requirements that are offered by the particular project and site characteristics. Thus if the property is small, it may require a vertical cylindrical tank versus a horizontal cylindrical tank. Fiberglass tankage is often used for pre-packaged plants or systems where aesthetics are important. Additionally, horizontal cylindrical tankage provides the best mixing properties when using diffused air. Various tank compositions such as steel, concrete, fiberglass, lined earthen basins, or a combination of compositions are reviewed and analyzed as required and determined by the owner, and environmental conditions. Another option to assess is retrofitting any existing tankage as it may offer an economical solution to the existing wastewater treatment plant. Other factors determining basin geometry are strength of the organic loading, and the peak flow (which is preferably assumed to be approximately twice the average daily flow) during a 4-hour duration. In addition, another factor in calculating the basin dimensions is the design MLVSS to which the wastewater plant is to be designed. Where tank geometry size or shape is not an issue, the design tankage should be calculated to accommodate a MLVSS of 3,500 mg/l, which has been found to be stable. Next, the invert depth of the influent piping should be calculated, and the sidewall depth (which is dependent upon the depth of the basin allowable in such a setting or environment) also should be calculated. The Bottom Water Level, High Water Level, and Top Water Level are then calculated based on the amount of volume required to accommodate the flow and strength of wastewater. This amount then determines the length and width of the wastewater treatment plant based on the overall geometry used in the particular tank design.

Proper mixing is determined by the depth of the wastewater in relation to the type of aeration utilized. The detention time at the Bottom Water Level, the amount of sludge storage, and the sludge production (preferably at 8,500 mg/l) are then calculated. The top height of the Pre-React Zone Director is preferably determined by the top height of the basin. The internal volume of the Pre-React Zone Director is determined by the overall basin geometry, and preferably is approximately 10% of the daily (or other) incoming influent volume. The length to width ratio of the Pre-React Zone Director is preferably approximately four to one for narrow basin geometry, and three to two for larger basins. The Pre-React Zone Director bottom height is calculated at a level above the basin floor to accommodate the desired flow ratio that one would desire. A flare or flap is preferably attached extending downwardly approximately 120 degrees from the vertical riser of the Pre-React Zone Director in all directions. The unique feature of a flare or flap allows for maximum laminar flow during the settle and decant phases of operation, and maximum flow of influent through the settled biomass (without stirring the biomass), while adding structural integrity.

The Influent Gate Housing diameter is calculated to accommodate the expected influent flow velocity (whether pumped or gravity fed) and volume into the wastewater treatment plant. The gates within the Influent Gate Housing are situated and installed in such a fashion to create one or multiple turbulence obstacles which the influent will pass over. This reduces influent velocity, and creates incidental aeration, which further reduces velocities by the natural reversing of flow upon contact with the water level, usually between the BWL and HWL. The gates are preferably angled approximately 135 degrees downwardly from the vertical riser of the housing. The number of gates is determined based on the kind of installation required and the height to which the influent must vertically drop to the BWL. Preferably, a base or T fitting is provided under the bottom of the Influent Gate Housing, which guides the influent to flow laterally. Preferably, the bottom of the Influent Gate Housing is set at approximately half of the Top Water Level, as determined above.

The amount of air that must be supplied to the system must be calculated next. The goal of the air calculations is to determine how much air must be delivered to the biomass. AOR is the actual amount of physical oxygen uptake biologically required. AOR is dependent on the amount of waste being removed. SOR is the amount of oxygen that must be delivered when adjusted for environmental conditions that affect uptake. These conditions include elevation, THETA, the wastewater medium (as opposed to pure water), ALPHA, and BETA. ALPHA, BETA, THETA, and CSM (a function of wastewater temperature) are obtained from reference tables readily available in most publications, such as *Design of Municipal Wastewater Treatment Plants,* WEF Manual of Practice, which is hereby incorporated by reference. The physical equipment required to deliver the SOR is a function of placement, size, and efficiency factors.

Other considerations to be taken into account in the air formulas include the operational DO level, time of aeration and surface tension correction factor, solubility correction factor, temperature correction factor, average water depth, AOR and correction factor SOR, oxygen transfer per meter of diffuser, oxygen transfer efficiency, air required for biological removal (which determines brake HP required), pressure, number of operating blowers, air per meter of diffuser, and ultimately the number of diffusers. Redundancy is very important; thus an additional standby blower is very important in a wastewater treatment plant.

Decanter pump sizing is determined by dividing the expected daily flow by the number of decant cycles desired per day to find the volume of flow per decant cycle, and then choosing the pump size necessary to pump that volume during the pump portion of a decant cycle, preferably with a redundancy added for maintenance. The effluent flow, velocity, and head loss incurred is another factor in decanter and pump sizing.

Preferably, a novel floating decanter is used that requires little to no maintenance because it is made of non corrosive materials (such as PVC). It decants supernatant from just below the surface and therefore does not decant floating solids or scum. It does not have any chain adjusting mechanisms or mechanical arm, is non-mechanical, contains no springs, has a PVC flotation bladder that does not require replacement but is not limited to such. It has recessed check valves that are not exposed to horizontal hydraulic and aeration turbulence found with other decanters. An advantage of having recessed check valves is that a small stationary bubble forms around the decanter port during the aeration phase of operation causing other bubbles to deflect away from the decanter port and avoid hitting the ball in the check valve, so that the check valve remains undisturbed and does not allow solids ("mixed liquor") to pass through. This allows the weight of the ball in the check valve to be reduced, thus reducing the electrical load on the decanter pump. This results in a superior supernatant. The check valves are also preferably made of non-corrosive materials. All components are readily available and the decanter is easily manufactured. The decanter is usually designed using a single row of decanter ports, but is not limited to such in larger systems. Thus, in larger systems, two or more rows of decanters can be connected together using simple "T" fittings, reducers, and cross fittings. In order to calculate the number of ports required for a decanter: calculate the buoyancy of the ball-check-valves by utilizing sphere diameter, sphere weight, and the specific weight of water. Calculate the minimum pressure to lift the ball, buoyancy and weight to determine the force required to lift the ball. Use expected flow, head loss, port sizes, and velocity to determine the number of ports at a maximum flow velocity of approximately 1–½ meters (5 feet) per second by each port. This decanter's maintenance free characteristics allow the owner or buyer to save capital, energy, and maintenance costs. Preferably, the discharge line for the decanter extends through the wall of the basin and is located just below the Bottom Water Level or (BWL).

Emergency gravity overflow is provided, sized, and calculated per the influent flow. The emergency gravity overflow is usually situated on the basin opposite the influent flow at a depth lower than the incoming influent invert. Preferably, a standard "T" fitting is attached to the overflow pipe with a downward extension of approximately ⅓ to ⅔ meters (12 to 24 inches) so that floating solids will not be gravity fed out the emergency gravity overflow. All fittings for this emergency gravity overflow are preferably "Y" fittings. It is advisable not to utilize 90-degree fittings, as the emergency overflow may become restricted.

The type and amount of available electrical power must be considered in finalizing all control, blower, and pump sizing.

Automation of the process is preferably provided by various float switches in conjunction with a clock. The clocks' primary purpose is to control the length and time of the aeration, and decant cycles. The BWL is kept at a minimum by the BWL float switch, which opens the decanter circuit (thus deactivating the decanter pump) during the decant cycle determined by the clock when the minimum level is met. Should an abnormal condition exist, the HWL switch would open the circuitry to the aeration cycle causing the aeration cycle to cease and go into a settle phase. The TWL switch would then close the decant circuit which bypasses the clock timer and starts an early decant until the circuit is opened. Should the emergency condition continue, the level would then close a AWL circuit causing selected conditions to occur such as a horn, light etc. to notify the proper authority. If the emergency condition should continue, the system would gravity overflow until the situation is remedied.

While the present invention has been disclosed in connection with the presently preferred embodiments described herein, there are other embodiments within the skill of a person of ordinary skill in the art that fall within the spirit and scope of the invention as defined by the claims. Because wastewater treatment plants vary in size and shape, and because of the highly customizable nature of this invention to fit the needs of a particular wastewater treatment system, there exist many variations and configurations of the presently preferred embodiments described above.

For example, there may be multiple influent gate housings 20 encompassed within a single pre-react zone director 34. Furthermore, multiple pre-react zone directors 34 may be utilized within a single basin 42.

The influent gate housing 20 may be in the shape of a downward spiral or some other design.

The influent gate housing bottom 30 may utilize a base that directs flows upward, downward, or other angle other than horizontal.

The pre-react zone director 34 may utilize a manually or automatically adjustable flap, or the pre-react zone director itself may be manually or automatically adjustable to vary the size of the contact zone by varying the height of the pre-react zone director from the bottom of the basin 42.

The pre-react zone director 34 may utilize multiple flaps.

This invention can be installed below ground if it is vented and if freezing can be prevented.

Accordingly, no limitations are to be implied or inferred in this invention except as specifically and explicitly set forth in the claims.

Industrial Applicability

This invention can be used whenever it is desired to have a secondary wastewater treatment system that achieves results comparable to tertiary wastewater treatment systems. This invention can be used whenever it is desired to utilize a highly efficient, low cost wastewater treatment system that produces high quality effluent on minimal land. This invention can be used when currently existing systems are inadequate or do not meet environmental standards or other requirements. For example, if existing cesspools or septic tanks are inadequate to accept additional wastewater, or if a sewage infrastructure has not been connected to a particular location, then this invention can be used to increase or provide wastewater and sewage treatment.

What is claimed is:

1. A device for decanting supernatant from below a liquid's surface, comprising:
    a body having a bottom and a plurality of holes;
    a bladder within said body that provides buoyancy for said body so that said body floats on said liquid's surface, said bladder defining a space between said body and said bladder;
    a decanter riser having an effluent port in fluid communication with one of said holes;
    a discharge line in fluid communication with said effluent port;
    activatable drawing means for drawing supernatant through said discharge line;
    a check valve riser in fluid communication with another of said holes having a supernatant intake port, said supernatant intake port being below said liquid's surface when said body floats on said liquid's surface;
    a valve operatively connected to said supernatant intake port that prevents substantial portions of any solids suspended in said liquid from passing through said supernatant intake port when said liquid is aerated;
    whereby when said drawing means is activated, supernatant is drawn through said supernatant intake port, through said valve, through said check valve riser, through said space between said bladder and said body, through said decanter riser, and out said discharge line.

2. A device according to claim 1, wherein said valve is a recessed ball check valve, comprising:
    a check valve housing positioned above said supernatant intake port, said check valve housing having a ball aperture with an aperture diameter; and
    a ball set into said ball aperture, said ball having a ball diameter greater than said aperture diameter;
    whereby supernatant drawn through said supernatant intake port will raise said ball and open said ball check valve.

3. A device for decanting supernatant from below a liquid's surface, comprising:
    a buoyant body having an interior, a bottom and a plurality of holes;
    a decanter riser having an effluent port in fluid communication with one of said holes;
    a discharge line in fluid communication with said effluent port;
    activatable drawing means for drawing supernatant through said discharge line operatively connected to said discharge line;
    a check valve riser in fluid communication with another of said holes having a supernatant intake port, said supernatant intake port being below said liquid's surface when said body floats on said liquid's surface;
    a valve operatively connected to said supernatant intake ports that prevents substantial portions of any solids suspended in said liquid from passing through said supernatant intake port when said liquid is aerated;
    whereby when said drawing means is activated, supernatant is drawn through said supernatant intake port, through said valve, through said check valve riser, through said interior and said body, through said decanter riser, and out said discharge line.

4. A device for decanting supernatant from below a liquid's surface, comprising:
    a buoyant body;
    a decanter riser attached to said body having an effluent port and a supernatant intake port, said supernatant intake port being below said liquid's surface when said body floats on said liquid's surface;
    a discharge line in fluid communication with said effluent port;
    activatable drawing means for drawing supernatant through said discharge line operatively connected to said discharge line;
    a valve operatively connected to said supernatant intake port that prevents substantial portions of any solids suspended in said liquid from passing through said supernatant intake port when said liquid is aerated;
    whereby when said drawing means is activated, supernatant is drawn through said supernatant intake port, through said valve, through said decanter riser, out said effluent port, and out said discharge line.

5. A device for decanting supernatant from below a liquid's surface, comprising:

a body having a bottom and a plurality of holes;

a bladder within said body that provides buoyancy for said body so that said body floats on said liquid's surface, said bladder defining a space between said body and said bladder;

a decanter riser having an effluent port in fluid communication with one of said holes;

a discharge line in fluid communication with said effluent port;

a decanter pump operatively connected to said discharge line;

a check valve riser in fluid communication with others of said holes having a supernatant intake port, said supernatant intake port being below said liquid's surface when said body floats on said liquid's surface;

valves operatively connected to said supernatant intake ports that prevent any solids suspended in said liquid from passing through said supernatant intake ports when said liquid is aerated;

whereby when said decanter pump is activated, supernatant is drawn through said supernatant intake ports, through said valves, through said check valve risers, through said space between said bladder and said body, through said decanter riser, and out said discharge line.

6. A device according to claim 5, wherein said valves are recessed ball check valves, each of said check valves comprising:

a check valve housing positioned above said supernatant intake port, said check valve housing having a ball aperture with an aperture diameter; and a ball set into said ball aperture, said ball having a ball diameter greater than said aperture diameter;

whereby supernatant drawn through said supernatant intake port will raise said balls and open said ball check valves.

7. A device for decanting supernatant from below a liquid's surface, comprising:

a buoyant body having a hollow interior, a bottom and a plurality of holes;

a decanter riser having an effluent port in fluid communication with one of said holes;

a discharge line in fluid communication with said effluent port;

a decanter pump operatively connected to said discharge line;

a check valve riser in fluid communication with others of said holes having a supernatant intake port, said supernatant intake port being below said liquid's surface when said body floats on said liquid's surface;

valves operatively connected to said supernatant intake ports that prevent any solids suspended in said liquid from passing through said supernatant intake ports when said liquid is aerated;

whereby when said decanter pump is activated, supernatant is drawn through said supernatant intake ports, through said valves, through said check valve risers, through said hollow interior and said body, through said decanter riser, and out said discharge line.

* * * * *